May 23, 1961    R. J. BYRNES ET AL    2,985,274
ARTICLE CONVEYORS

Filed Feb. 1, 1960    3 Sheets-Sheet 1

Inventors
Richard J. Byrnes
Norbert Sadowski
By H. R. Rather
Attorney

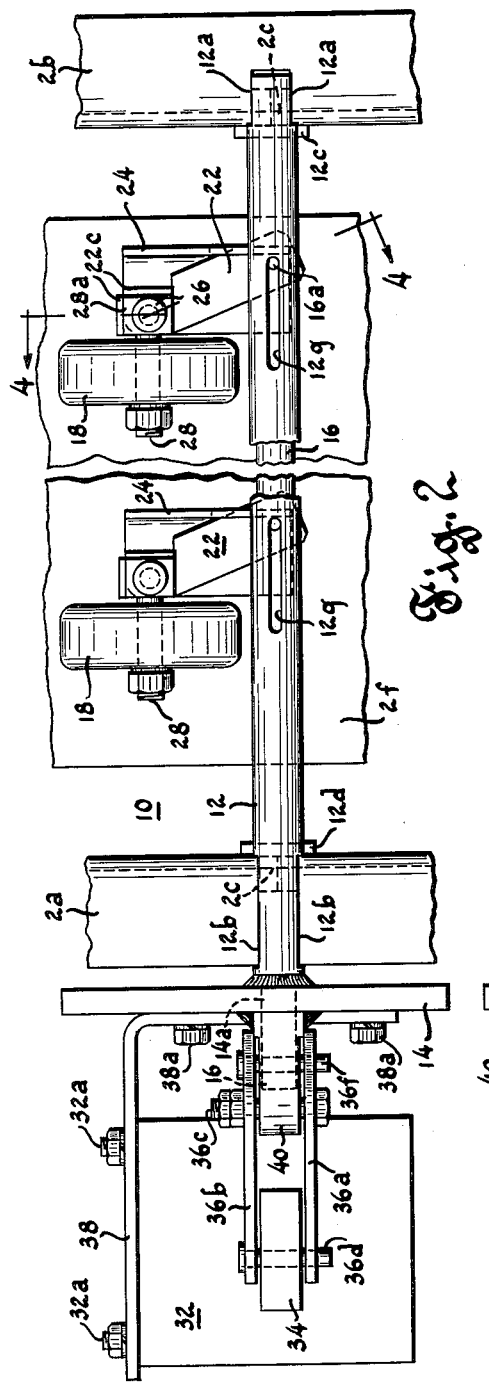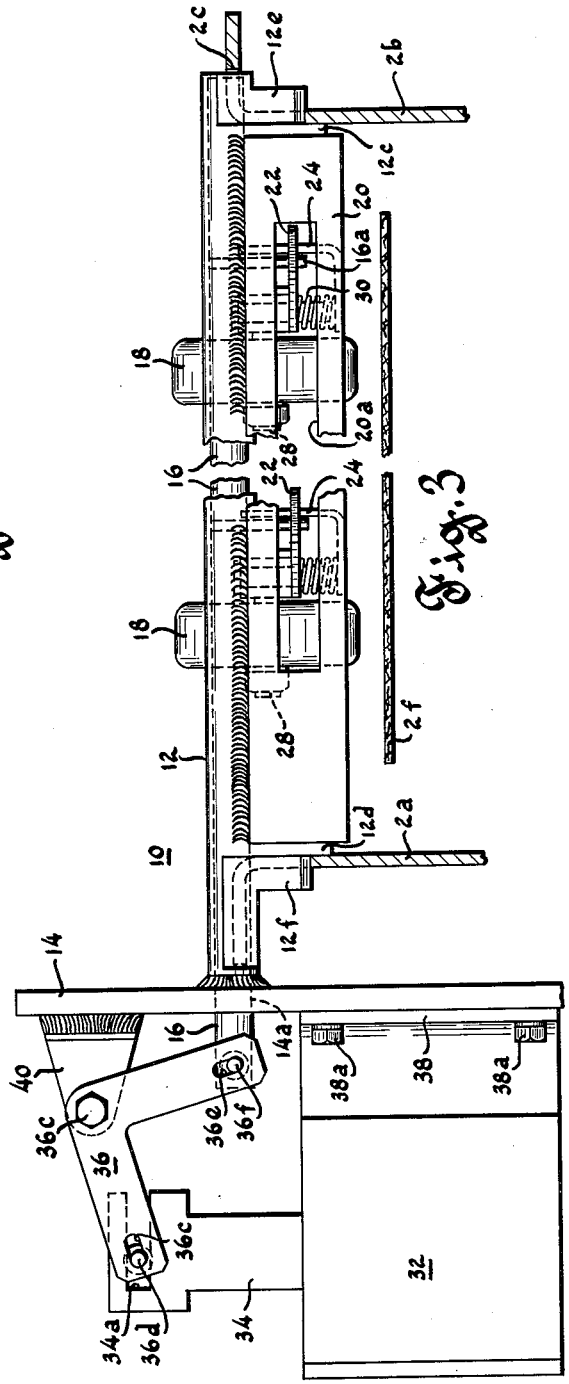

2,985,274
ARTICLE CONVEYORS

Richard J. Byrnes, West Allis, and Norbert Sadowski, Milwaukee, Wis., assignors to Cutler-Hammer, Inc., Milwaukee, Wis., a corporation of Delaware Filed Feb. 1, 1960, Ser. No. 5,793

11 Claims. (Cl. 198—20)

This invention relates to article conveyors and more particularly to diverter mechanisms therefor.

While not limited thereto, the invention is especially applicable to roller conveyors of the belt driven type or the like, for diverting the thing being conveyed such as an article or article carrier from a main conveyor to a branch conveyor which is at a substantially right angle or parallel with the main conveyor.

An object of the invention is to provide improved diverter mechanisms for a conveyor.

A more specific object of the invention is to provide improved diverter mechanisms which are simple and economical in construction and efficient and reliable in operation.

Another specific object of the invention is to provide an improved diverter device which can be mounted in place of a roller or between a pair of rollers at any desired point along the conveyor without significant modification of the conveyor.

A further specific object of the invention is to provide such diverter device which is capable of turning and diverting an article or article carrier from a main conveyor to a branch conveyor which is at a right angle or parallel with the main conveyor.

Another object of the invention is to provide an improved diverter device which is selectively and electrically operable between non-diverting and diverting positions and which is operable in its diverting position to steer an article substantially frictionlessly from one conveyor to another.

A further object of the invention is to provide such diverter device which is capable of selectively turning and diverting one or more articles of a series thereof which may be spaced relatively close to one another.

Another object of the invention is to provide a selectively operable diverter device which significantly increases the rate at which articles are diverted from one conveyor to another.

Other objects and advantages of the invention will hereinafter appear.

While the apparatus hereinafter described is effectively adapted to fulfill the objects stated, we do not intend to confine our invention to the particular preferred embodiments of diverter mechanisms disclosed, inasmuch as they are susceptible of various modifications without departing from the scope of the appended claims.

The invention will now be described in detail with reference to the accompanying drawings wherein:

Fig. 2 is an enlarged top view of the diverter mechanism of Fig. 1;

Fig. 3 is a front elevation view of the diverter mechanism of Fig. 2;

Figure 1:
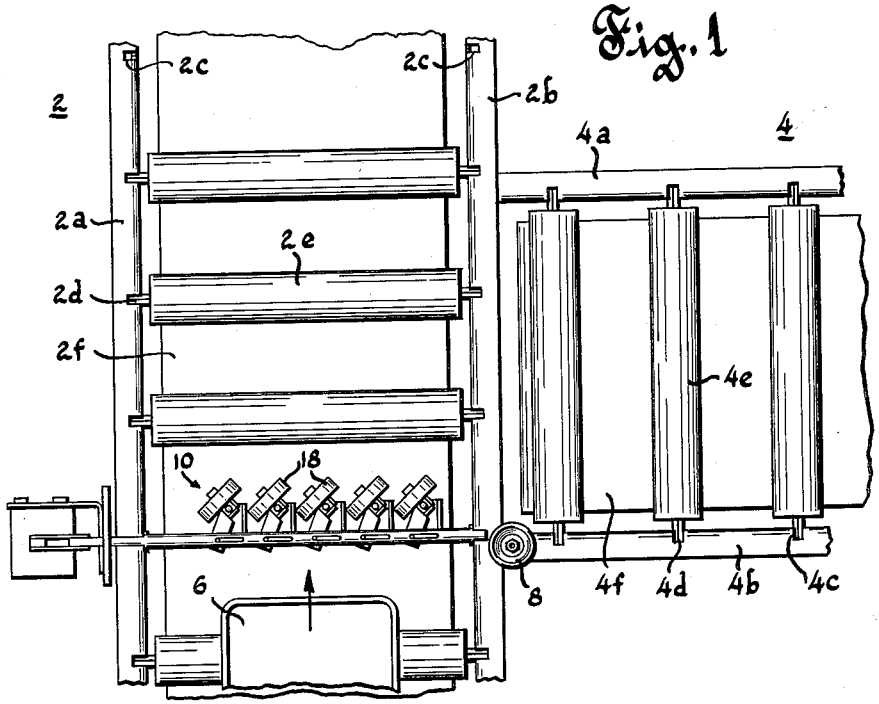
Figure 1 is a top view of an article conveyor and diverter mechanism constructed in accordance with the invention.

Referring to Fig. 1, there is shown an article conveyor consisting of a main conveyor 2 and a branch conveyor 4 the latter extending from the right-hand side of the main conveyor at a right angle. While branch conveyor 4 is shown at a right angle to main conveyor 2, it will be apparent that the branch conveyor could as well be arranged at an obtuse angle with or adjacent to and parallel with the main conveyor. The conveyors are of the well known belt driven roller type and are adapted for conveying an article or article carrier such as, for example, a tray 6 or the like. To this end, main conveyor 2 is provided with a pair of generally shallow U-shaped support or frame members 2a and 2b. These members are arranged on edge with their open sides facing in opposite directions to form side rails for the conveyor. The upper, inner corners of frame members 2a and 2b are provided with equally spaced notches 2c, each notch on member 2a being in lateral alinement with a corresponding notch on member 2b and each such pair of alined notches being adapted to accommodate and securely support the ends of an axle 2d of a roller 2e. The end portions of axle 2d may be provided with suitalbe flat or partially flat sides to be held against rotation in their associated notches 2c whereas roller 2e is mounted for free rotation on the axle. It will be apparent that rollers 2e are held in their respective positions by gravity and that each such roller may be freely lifted from its notches if it is desired to remove the same. Rollers 2e are frictionally driven by an endless motor driven belt 2f. In conveyors of this type, a plurality of idler rollers, not shown, one for each conveyor roller, are mounted below belt 2f and these idler rollers are staggered relative to rollers 2e to bias belt 2f into frictional engagement with rollers 2e.

Similarly, branch conveyor 4 is provided with a pair of like spaced frame members 4a and 4b each having notches 4c for receiving the ends of axles 4d of a plurality of spaced rollers 4e. These rollers are frictionally driven by an endless motor driven belt 4f and a plurality of freely rotatable idler rollers, not shown, are mounted in a suitable manner below belt 4f for biasing the belt into frictional engagement with rollers 4e. A freely rotatable guide wheel 8 is journaled on the end of frame member 4b at the entry side of branch conveyor 4 for guiding tray 6 as it turns from the main conveyor to the branch conveyor.

Main conveyor 2 is provided with a diverter mechanism 10 immediately adjacent the entry side of the branch conveyor as shown in Fig. 1. This diverter mechanism is mounted in place of one conveyor roller. To this end, the notch 2c in the frame member 2a is extended all the way through the upper flange thereof to accommodate the diverter shaft extending to its operating mechanism.

As shown in Figs. 2 and 3, diverter mechanism 10 is provided with an elongated supporting tube 12 rigidly secured as by welding to a supporting plate 14 which supports the diverter operating mechanism hereinafter described. The right-hand end portion of tube 12 is provided with laterally opposite flat sides 12a and the left-hand end portion of tube 12 is provided with similar flat sides 12b whereby the tube is securely held in notches 2c in the frame members in a non-rotary manner. Tube 12 is also provided at the inner end of each such flat portion with a generally flat downwardly extending projection 12c and 12d for engagement with the inner flat surfaces of frame members 2a and 2b to retain the tube in the notches and to prevent axial movement thereof. The portions of tube 12 entering into notches 2c are provided with suitable downward projections 12e and 12f, Fig. 3, seating in the bottom of each notch to maintain the diverter mechanism at the proper height relative to rollers 2e.

Figure 4:
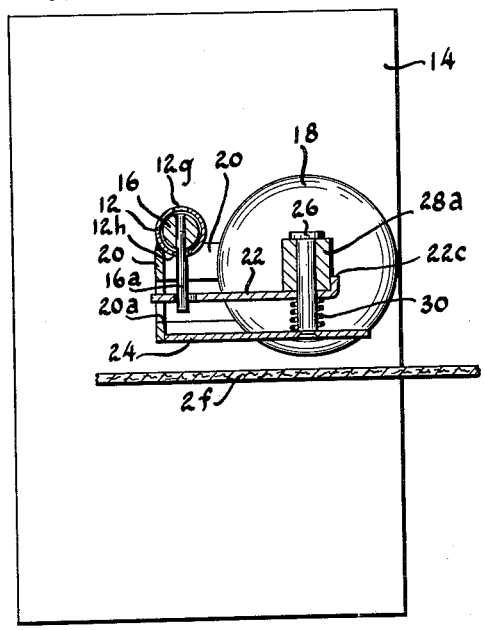
Fig. 4 is a cross-sectional view taken along line 4—4 of Fig. 2.
Figure 5:
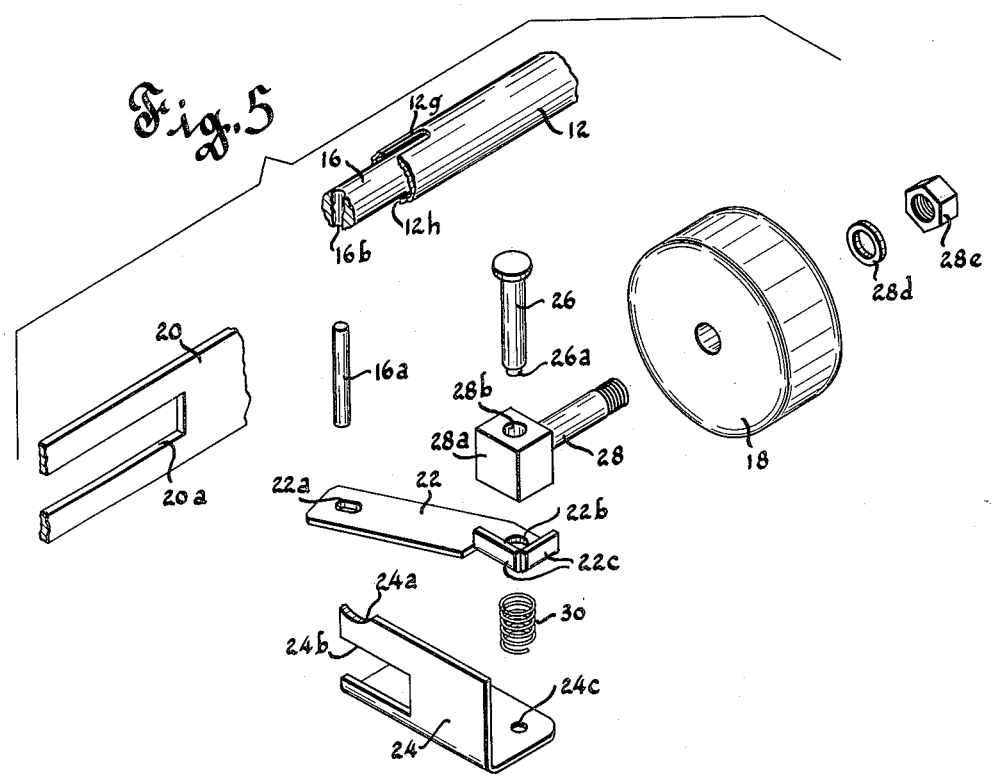
Fig. 5 is an exploded view of one diverter wheel unit of Figs. 1–4.

A solid rod 16 is freely slidable inside tube 12 and extends through a hole 14a in plate 14 and beyond the plate. Rod 16 is provided with a plurality of spaced, downwardly extending pins 16a which are friction fitted into holes 16b equally spaced along and extending through the rod, one such hole being more clearly shown in Fig. 5. To facilitate assembly of pins 16a in the holes in the rod, tube 12 is provided along its upper side with elongated apertures 12g equally spaced therealong. The lower side of tube 12 is provided with similar elongated apertures 12h as shown in Figs. 4 and 5 affording clearance for pins 16a when the rod is slidably moved within the tube.

Figure 6:
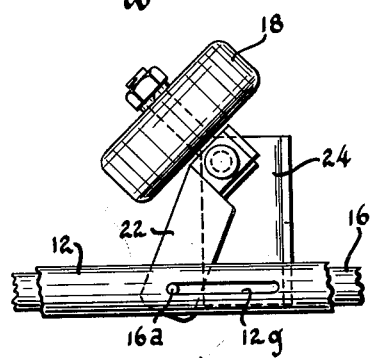
Fig. 6 is a top view of one diverter wheel unit of Figs. 1–4 showing the wheel in its diverting position.

As shown in Fig. 1, five diverting wheels 18 are supported from tube 12. To this end, an elongated plate 20 is rigidly secured at its upper edge as by welding to tube 12. As shown in Figs. 3 and 4, plate 20 extends tangentially and downwardly from tube 12 and is provided with a rectangular elongated aperture 20a providing clearance for one end of levers 22 when the wheels are shifted to their diverting position under the action of pins 16a. A bracket 24, shown in Fig. 5, is provided for supporting each diverting wheel 18. Bracket 24 is bent at a right angle along its length and one of its upstanding sides is provided with an arcuate notch 24a for complementary engagement with the lower side of tube 12 with bracket 24 extending transversely from the tube. Bracket 24 is rigidly secured as by welding at notch 24a to tube 12. The upstanding side of bracket 24 in also provided with a rectangular aperture 20b opening to the aforementioned end thereof to provide clearance for the aforementioned end of lever 22 when wheels 18 are operated from their non-diverting to their diverting position as shown in Figs. 2 and 6. The aforementioned end of bracket 24 abuts plate 20, as shown in Figs. 3 and 4, and is rigidly secured thereto as by welding. The other end of bracket 24 is provided with a hole 24c adjacent the corner of its horizontal side, more clearly shown in Fig. 5, for receiving the reduced end 26a of a pivot pin 26 which may be riveted thereto.

Lever 22 is provided at one end with an aperture 22a for accommodating the free end of pin 16a. Aperture 22a is elongated to afford free translation between the linear motion of pin 16a and the rotary or arcuate motion of lever 22. The other end of lever 22 is provided with a hole 22b for freely pivoting the lever on pivot pin 26. Such other end and one side of lever 22 immediately adjacent such end are provided with perpendicular flanges 22c for complementary engagement with two sides of the end block 28a of a wheel axle 28, such block being pivoted on pivot pin 26 through a hole 28b extending vertically therethrough. Axle 28 supports wheel 18 rotatably thereon and the other end of the axle is threaded to receive a washer 28d and a nut 28e to retain diverting wheel 18 on the axle. A helical compression 30 surrounds pivot pin 26 between bracket 24 and lever 22 to resiliently bias diverting wheel 18 upwardly against the bottom of tray 6 traveling thereover.

There is shown at the left-hand portions of Figs. 2 and 3 an electroresponsive operator for the diverter mechanism. The operator comprises an electrical coil or solenoid 32 for operating a plunger type armature 34, the latter in turn operating rod 16 through a crank 36. Solenoid 32 is mounted by bolts 32a or the like on one portion of a substantially L-shaped mounting bracket 38, the transverse portion of the bracket being secured to mounting plate 14 by bolts 38a or the like. Plunger 34 is provided at its upper end, as seen in Fig. 3, with an elongated open slot 34a to provide sliding clearance for translating between the linear motion of plunger 34 and the rotary or arcuate motion of crank 36. Crank 36 comprises a pair of spaced right angle members 36a and 36b rotatably pivoted at their apex onto a bolt 36c extending therethrough and through the end of a horizontal mounting projection 40 rigidly secured as by welding to plate 14. The ends of the horizontally projecting portions of members 36a and 36b are provided with alined elongated apertures 36c accommodating a pin 36d, the midportion of which is received in driving relation in slot 34a in the plunger. The ends of the downwardly extending portions of members 36a and 36b are provided with alined elongated apertures 36e accommodating a similar pin 36f, the midportion of which extends through a hole in the left-hand end of rod 16.

The operation of the diverter mechanism shown in Figs. 1–6 will now be described. Let it be assumed that tray 6 is being conveyed along main conveyor 2 in the direction indicated by the arrow as shown in Fig. 1 and that as it approaches the intersection it is desired to divert the tray onto branch conveyor 4. To this end, solenoid 32, Figs. 2 and 3, is energized. This causes plunger 34 to be moved upwardly from the position shown in Fig. 3. As a result, crank 36 rotates clockwise about pivot pin 36c to slide rod 16 in the left-hand direction. Rod 16 carries pins 16a therewith to rotate each lever 22 about its pivot pin 26. Block 28a which is integral with axle 28 being securely confined within flanges 22c of lever 22, such rotation of lever 22 carries axle 28 with it and rotates each associated diverter wheel 18 from the non-diverting position shown in Fig. 2 substantially 45 degrees to the diverting position shown in Figs. 1 and 6. As shown in the enlarged view of Fig. 6, apertures 12g and 12h in the upper and lower sides of tube 12, respectively, aperture 12h being shown in Figs. 4 and 5, are of equal length and are of a length so that pin 16a stops against the left-hand end of aperture 12h when the wheel is rotated to an angle of substantially 45 degrees from the primary axis of the main conveyor. This angle of substantially 45 degrees has been found to afford effective turning of the tray onto the branch conveyor. As the tray is being diverted, wheel 8 shown in Fig. 1 guides the tray around the turn. When the leading end of tray 6 engages the first roller 4e of the branch conveyor, the diverting wheels 18 swing the trailing end of the tray so that it is turned 90 degrees and continues along the center of the branch conveyor. The amount of turning may be adjusted by adjusting the speeds of the conveyors, particularly the main conveyor and effective turning is accomplished at normal conveyor speeds.

Figure 7:
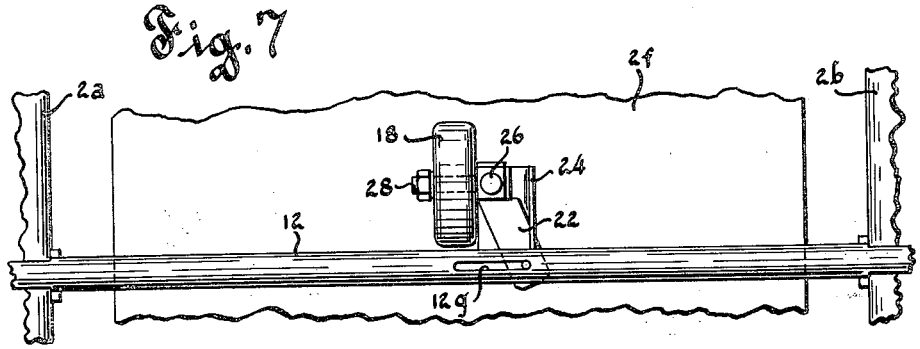
Fig. 7 is a top view of a modification of the diverter mechanism of Figs. 1–6 employing a single diverting wheel.

Referring to Fig. 7, there is shown a modification of the diverter mechanism of Figs. 1–6. This modification is similar to that hereinbefore described except that a single diverter wheel 18 is employed which is positioned centrally of the main conveyor. For this purpose, tube 12 is provided with a single pair of apertures 12g and 12h; otherwise, the construction and operation are similar to that shown in Figs. 1–6 and hereinbefore described. It has been found that for certain articles, a single diverter wheel is sufficient to divert the same from the main conveyor to the branch conveyor, particularly when such article has minimum unevenness at its lower portion.

We claim:

1. In a conveyor of the roller type for conveying articles therealong and having a plurality of article supporting and conveying rollers spaced longitudinally thereof, the improvement comprising a diverting mechanism mounted at a selected point along the conveyor in place of one of the rollers, said diverting mechanism comprising a hollow supporting member, at least one diverter wheel, means supporting said wheel on said member for rotation about a horizontal axis and for pivoting on a vertical axis, means resiliently biasing said wheel a predetermined amount above the upper level of the adjacent conveyor rollers to engage an article conveyed along the conveyor, said wheel having a non-diverting position wherein its vertical plane is coincident with the direction of travel of the articles along the conveyor and a diverting position wherein its vertical plane is at a predetermined angle toward a side of the conveyor, and operating means for pivoting said wheel on said vertical axis to said predetermined angle to turn and divert an article off the conveyor, said operating means comprising an electroresponsive actuator, and an elongated member slidable in said hollow supporting member for pivoting said wheel under the action of said electroresponsive actuator.

2. In a conveyor of the roller type for conveying articles therealong and having a plurality of article supporting and conveying rollers spaced longitudinally thereof, the improvement comprising a diverting mechanism mounted at a selected point along the conveyor between a pair of conveyor rollers, said diverting mechanism comprising a supporting member arranged transversely of the conveyor, at least one diverter wheel, means supporting said wheel on said member for free rotation about a horizontal axis and for pivoting on a vertical axis, means resiliently biasing said wheel a predetermined amount above the upper level of the adjacent conveyor rollers to engage an article conveyed along the conveyor, said wheel supporting means having a lever extending therefrom and having an aperture in the free end thereof, said wheel having a non-diverting position coincident with the direction of travel of an article along the conveyor and a diverting position at a predetermined angle toward a side of the conveyor, and operating means comprising an electroresponsive actuator and an elongated operating member axially movable by said actuator and having an operating pin extending therefrom into said aperture in said lever for pivoting said wheel into its diverting position when said actuator is operated.

3. The invention defined in claim 2, wherein said wheel supporting means comprises a bracket extending horizontally from said transverse supporting member, a pivot pin extending upwardly from said bracket, a wheel axle pivotally mounted at one end on said pivot pin, and said lever being pivoted at one end on said pivot pin and being secured to the pivoted end of said wheel axle.

4. The invention defined in claim 3, together with a helical spring surrounding said pivot pin and being in compression between said bracket and said lever.

5. The invention defined in claim 3, wherein said pivoted end of said wheel axle is provided with a substantially cubical block having a vertical hole therethrough for accommodating said pivot pin, and said pivoted end of said lever is provided with at least two upstanding flanges embracing said block to rotate said axle on said pivot pin when said lever is rotated.

6. The invention defined in claim 2, wherein said transverse supporting member is a tube having an elongated aperture therein, and said elongated operating member is a rod slidable in said tube with said operating pin extending through the aperture in said tube.

7. The invention defined in claim 2, wherein said aperture in the free end of said lever which accommodates said operating pin is elongated to afford translation between the linear motion of said elongated operating member and the rotary motion of said lever.

8. In a conveyor of the roller type for conveying articles therealong and having a plurality of article supporting and conveying rollers spaced longitudinally thereof, the improvement comprising a diverting mechanism mounted at a selected point along the conveyor between a pair of conveyor rollers, said diverting mechanism comprising a supporting member arranged transversely of the conveyor, a plurality of brackets extending from said supporting member in spaced apart relation, a corresponding plurality of diverter wheels, means supporting one of said wheels on each said bracket for free rotation about a horizontal axis and for pivoting on a vertical axis between a non-diverting position coincident with the direction of travel of articles along the conveyor and a diverting position at a predetermined angle toward a side of the conveyor, said wheel supporting means comprising a lever extending therefrom which is provided with an aperture in the free end thereof, and operating means for pivoting said wheels on the vertical axis of said predetermined angle to turn and divert an article off the conveyor, said operating means comprising an electroresponsive actuator, an elongated operative member extending from said actuator and mounted for axial movement transversely of the conveyor, and a plurality of transverse projections extending from said elongated operating member and rigidly secured thereto, there being one such projection for each wheel and the free ends of said projections extending into said apertures in said levers for pivoting said wheels when said operating member is moved under the control of said actuator.

9. The invention defined in claim 8, wherein said predetermined angle is an angle of approximately forty-five degrees toward a side of the conveyor from the major axis thereof.

10. The invention defined in claim 8, wherein said supporting member is a hollow tube provided with a plurality of elongated apertures spaced therealong, and said elongated operating member is a rod slidable in said tube with said projections extending through the apertures in said tube into engagement with said apertures in said levers, and said apertures in said tube being arranged to limit sliding of said rod when said wheels are in their diverting and non-diverting positions.

11. The invention defined in claim 8, wherein said electroresponsive actuator comprises a solenoid mounted on one side of the conveyor, a plunger for said solenoid movable upwardly when said solenoid is energized, a crank responsive to said upward movement of said plunger for moving said elongated operating member thereby to pivot said wheels into their diverting position, and deenergization of said solenoid causing the weight of said plunger to return said wheels to their non-diverting position.

No references cited.